United States Patent
Nakamura et al.

(10) Patent No.: US 7,988,031 B2
(45) Date of Patent: Aug. 2, 2011

(54) REFLOW FURNACE AND HEATER FOR BLOWING HOT AIR

(75) Inventors: Hideki Nakamura, Koshigaya (JP); Tomotake Kagaya, Kashiwa (JP); Tsutomu Hiyama, Katsusika-ku (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 730 days.

(21) Appl. No.: 10/585,344

(22) PCT Filed: Dec. 21, 2004

(86) PCT No.: PCT/JP2004/019061
§ 371 (c)(1), (2), (4) Date: May 11, 2009

(87) PCT Pub. No.: WO2005/065876
PCT Pub. Date: Jul. 21, 2005

(65) Prior Publication Data
US 2010/0012705 A1  Jan. 21, 2010

(30) Foreign Application Priority Data

Jan. 7, 2004 (JP) ................................. 2004-001539

(51) Int. Cl.
*B23K 31/02* (2006.01)
*B23K 3/04* (2006.01)
*F27B 14/00* (2006.01)

(52) U.S. Cl. ......... 228/42; 228/20.1; 228/256; 219/420; 432/120

(58) Field of Classification Search ................... 228/42, 228/19, 20.1, 256; 219/420; 432/120
See application file for complete search history.

(56) References Cited

U.S. PATENT DOCUMENTS

| | | | | |
|---|---|---|---|---|
| 4,938,410 A | * | 7/1990 | Kondo | 228/180.1 |
| 5,163,599 A | * | 11/1992 | Mishina et al. | 228/42 |
| 5,567,151 A | * | 10/1996 | Mizoguchi et al. | 432/145 |

FOREIGN PATENT DOCUMENTS

| | | | |
|---|---|---|---|
| JP | 02137691 | | 5/1990 |
| JP | 08125327 | | 5/1996 |
| JP | 08125327 A | * | 5/1996 |
| JP | 08242075 | | 9/1996 |
| JP | 10284831 | | 10/1998 |
| JP | 11204932 A | * | 7/1999 |
| JP | 2000022325 | | 1/2000 |
| JP | 2003033867 | | 2/2003 |

* cited by examiner

*Primary Examiner* — Jessica L Ward
*Assistant Examiner* — Devang R Patel
(74) *Attorney, Agent, or Firm* — Michael Tobias (57) ABSTRACT

A reflow furnace using a conventional heater for blowing hot air has difficulty in reducing Δt and in stabilizing the oxygen concentration at a low level. In addition, it is difficult to uniformly discharge hot air from the discharge holes in a perforated plate of a conventional heater for blowing hot air. In a reflow furnace according to the present invention, the total area per unit area of discharge holes formed in a perforated plate in a heater for blowing hot air installed in a main heating zone is 1.5-5 times the total area per unit area of the discharge holes formed in a perforated plate of a heater for blowing hot air installed in a preheating zone. A heater for blowing hot air has a body divided into three chambers by partitions.

11 Claims, 6 Drawing Sheets

REFLOW FURNACE AND HEATER FOR BLOWING HOT AIR

TECHNICAL FIELD

This invention relates to a reflow furnace for soldering of printed circuit boards and electronic parts to each other, and to a heater of the type which blows hot air suitable for a reflow furnace.

BACKGROUND ART

Soldering in a reflow furnace is carried out by applying a suitable amount of a solder paste to portions to be soldered of a printed circuit board with a printing apparatus or a dispenser, mounting electronic parts on the portions to which solder was applied, and performing heating in a reflow furnace to melt the solder paste and solder the printed circuit board and the electronic parts to each other.

A reflow furnace is equipped with a preheating zone, a main heating zone, and a cooling zone. When soldering of a printed circuit board is carried out in a reflow furnace, in the preheating zone, solvents in the solder paste are vaporized and thermal shock due to high temperature heating in the main heating zone is reduced. In the main heating zone, solder powder in the solder paste is melted, and it wets and spreads over the portions to be soldered of a printed circuit board. In the cooling zone, the printed circuit board which was heated to a high temperature is rapidly cooled, molten solder is solidified, and electronic parts are protected against the effects of heat.

In general, during soldering of a printed circuit board in a reflow furnace, in the preheating zone, the entire printed circuit board is uniformly heated at a low temperature for a somewhat long time in order to vaporize solvents in the solder paste and to alleviate thermal shock due to rapid heating in the main heating zone, and in the main heating zone, rapid heating is performed in a short length of time to a temperature of at least the melting point of the solder powder in the solder paste. Thus, a reflow furnace abruptly changes from the preheating temperature, which is experienced for a long period, to the main heating temperature, and in the main heating zone, the heating time is shortened so as not to thermally damage electronic parts and printed circuit boards.

Heaters used for reflow furnaces include far infrared heaters using only electrothermal heaters, hot air-blowing heaters which blow hot air from a large number of holes or nozzles, and far infrared hot air-blowing heaters which combine far infrared rays with blowing of hot air.

Far infrared rays can pass to the interior of an object being heated and perform heating, but they cannot reach the lower portions of electronic parts or parts that are in shadows, so it is difficult to perform uniform heating with a heater using only far infrared rays. With a heater using only hot air, hot air can flow around to the bottom of electronic parts or portions that are in shadows to perform heating, but the hot air cannot adequately heat the interior of objects being heated. A heater employing both far infrared rays and hot air utilizes the advantages of far infrared rays and hot air, and it can adequately heat the interior of an object being heated as well as the bottom of electronic parts and portions in shadows, so today it is utilized in many reflow furnaces.

With printed circuit boards which are incorporated into electronic equipment requiring high reliability such as computers or communications equipment, if flux residue remains on the printed circuit boards after soldering in a reflow furnace, the flux sometimes causes a deterioration in the properties of the electronic equipment. This is because activators which are added to flux remain in flux residue. Moisture-absorbing activators easily absorb moisture in air, and they sometimes corrode conductors or reduce the insulation resistance between adjoining conductors. Therefore, it is necessary to clean off flux residue after soldering of printed circuit boards to be incorporated into electronic equipment requiring high reliability.

Organic solvents such as trichloroethylene, Freon, and alcohol are suitable as cleaning agents for flux residue. However, these solvents break down the ozone layer surrounding the earth and produce global warming. Therefore, they are a cause of destruction of the global environment, so their use is being regulated. Accordingly, so-called no-clean solder paste which does not require cleaning of flux residue after soldering is used for soldering of printed circuit boards for high reliability electronic equipment.

No-clean solder pastes employ a minimized amount of activators which causes absorption of moisture, or they employ activators having a weak activating action. At the time of soldering, activators reduce and remove oxide films which cover the portions to be soldered of a printed circuit board or the surface of solder powder and they enable molten solder to adequately wet and spread over portions to be soldered so that soldering can be carried out without defects. In addition, activators completely melt solder powder so as to prevent formation of minute solder balls which can be the cause of short circuits or a reduction in insulation resistance.

A no-clean solder paste can be used with printed circuit boards for high reliability electronic equipment, but if a non-clean solder paste is used in air, the wetting and spreading of the solder paste on portions to be soldered becomes poor, and a large amount of minute solder balls end up forming. This is because oxygen in air has a large influence, and the action of a small amount of activator or a weak activator cannot compensate for this influence. However, if a no-clean solder paste is used in a state without oxygen, i.e., in an inert atmosphere, molten solder adequately wets and spreads over portions to be soldered, and minute solder balls are no longer formed, so good soldering can be carried out. Today, in soldering of printed circuit boards incorporated into electronic equipment requiring high reliability, soldering is often carried out using a non-clean solder paste in a reflow furnace having an inert atmosphere.

In a reflow furnace with an inert atmosphere (referred to below simply as a reflow furnace), it is necessary for the oxygen concentration to be made as low as possible, but in a reflow furnace using a heater which blows hot air, hot air flows into the furnace, and it becomes easy for outside air to enter from the entrance and exit of the reflow furnace, so it is easy for the oxygen concentration to increase and to become unstable. However, a reflow furnace using a heater which blows hot air can more easily form a temperature profile suitable for heating of printed circuit boards than can a reflow furnace using only far infrared rays, so heaters combining far infrared rays and blowing of hot air are much used in reflow furnaces.

In a reflow furnace, heating must be carried out so that the temperature distribution is uniform and temperature differences are small among all locations on a printed circuit board on which electronic parts are mounted. Small electronic parts such as chip parts and large electronic parts such as integrated circuit parts are randomly mounted on a printed circuit board. Small electronic parts have a small heat capacity, so their portions to be soldered rapidly increase in temperature, but large electronic parts have a large heat capacity, so their portions to be soldered experience a slow increase in temperature. The temperature difference between portions to be soldered which rapidly increase in temperature and reach a high temperature early and portions to be soldered which have a slow temperature increase and which do not increase in temperature is referred to as Δt. In a reflow furnace, Δt is preferably as small as possible. This is because if the temperature of the main heating zone of a main heating furnace is set in accordance with the temperature of portions having a fast temperature increase, even if solder paste which is applied to these portions melts, solder paste which is applied to portions having a slow temperature increase does not completely melt, or even if the solder paste melts, the surface activity of the molten solder is low, so it does not completely wet and spread on the portions to be soldered. Conversely, if the temperature is set in accordance with the temperature of portions having a low temperature increase, when solder paste which is applied to these portions is melted, portions having a rapid temperature increase are overheated, and electronic parts and the printed circuit board undergo thermal damage.

There have been many proposals of reflow furnaces such as those in which the size of holes from which air is blown is varied or the position of the holes is varied in order to reduce Δt when using a heater of the type blowing hot air (a heater combining infrared rays and blowing of hot air). In JP H2-137691 A, infrared heaters and nozzles for blowing hot air are installed in a heating portion, the nozzles are installed in a direction perpendicular to the direction of transport, and a large number of small holes provided in the nozzles successively increase in size in the direction of transport. In JP H10-284831 A, the number and area of holes for blowing hot air in a plate for blowing hot air is set so that the amount of hot air which is discharged from the holes is larger on the exit side of the apparatus and is smaller on the discharge side of the apparatus. In JP 2000-22325 A, a mask having a large number of holes formed therein is provided on a discharge port for hot air, and a cover is provided for preventing the passage of hot air to a portion of the mask corresponding to electronic parts which are sensitive to overheating. In JP 2003-33867 A, a large number of through holes are randomly arranged in a plate-shaped material.

A heater which blows hot air in JP H2-137691 A has a structure in which a plurality of pipes are installed in a direction perpendicular to the direction of transport, holes are formed in these pipes, and hot air is discharged from the holes. A heater for blowing hot air in JP H10-284831 A has a structure in which through holes are formed between an outer chamber and an inner chamber, hot air which flows in through the through holes passes through a heating chamber via a suction inlet and enters a hot air supply port, and then hot air is blown out from holes in a plate for blowing hot air installed in the inner chamber. A heater for blowing hot air in JP 2000-22325 A has a structure in which a partition is provided inside a furnace wall, a fan is provided below the partition, a heater is provided on one side of the partition, and a mask having a large number of discharge holes is detachably mounted in the upper portion of the partition. In JP 2003-33867 A, gas is sucked in along both sides of a perforated plate, and hot air is discharged from its center.

SUMMARY OF THE INVENTION

In a conventional reflow furnace having a heater for blowing hot air in which discharge ports comprise a large number of holes, if it is attempted to reduce Δt, the oxygen concentration does not adequately decrease, and if it is attempted to adequately decrease the oxygen concentration, in this case Δt does not decrease, so if one feature is satisfied, the other is not satisfied, and if the other is satisfied, the first one is not satisfied, and it was not possible to satisfy both. In addition, in a conventional heater for blowing hot air, the discharge of hot air from a perforated plate was not uniform, and there were cases in which the amount of discharged air locally increased or decreased. The present invention provides a reflow furnace which can adequately decrease the oxygen concentration in spite of being able to achieve a low Δt and a heater for blowing hot air which can uniformly discharge hot air from all of its holes.

The present inventors noted that heat input by hot air is important to heating of a printed circuit board in a reflow furnace, and that the amount of hot air which is blown in each zone greatly influences the formation of a temperature profile suitable to each type of printed circuit board. The present inventors performed diligent investigations concerning the cause of why a conventional reflow furnace could not satisfy both Δt and the oxygen concentration and why it could not create an ideal temperature profile. They found that in a conventional reflow furnace, the amount of hot air in the preheating zone was not suitable for heating at a low temperature for a long period, and that the amount of hot air in the main heating zone was not suitable for a rapid temperature increase of a printed circuit board. The fact that the relative balance between the amount of hot air blown from the preheating zone and the amount of hot air blown from the main heating zone was inappropriate was the reason why both could not be satisfied. Namely, in order to adequately vaporize solvents in flux in solder paste, preheating in a reflow furnace must be relatively gentle compared to main heating. This is because if a large amount of air is blown and there is a large heat input during preheating just as occurs in main heating, flux in the solder paste will suddenly boil, and the solder paste will end up being scattered.

In a preheating zone, in order for the entirety of a printed circuit board to achieve a uniform temperature, heating must be carried out at a low temperature for a longer period of time than in a main heating zone. However, in a conventional reflow furnace, the size or the number of the hot air discharge holes in heaters for blowing hot air which were installed in the preheating zone and the main heating zone was the same, or the overall area of the holes for blowing hot air in the heaters for blowing hot air in the preheating zone was larger than the overall area of the holes for blowing hot air in the heaters for blowing hot air in the main heating zone, or the balance between the amount of hot air blown from the preheating zone and the amount of hot air blown from the main heating zone was not suitable for stabilizing the oxygen concentration. Namely, in a conventional reflow furnace, the heating condition in the preheating zone was the same as the heating condition in the main heating zone, or it entailed a larger heat input, so problems developed with respect to Δt and the oxygen concentration.

The present inventors discovered that if the amount of air which is blown in the main heating zone is made larger than the amount of air which is blown in the preheating zone, Δt can be made small, and if the overall area of the hot air discharge holes in a heater for blowing hot air which is installed in the main heating zone is made a suitable amount larger than the overall area of the hot air discharge holes in a heater for blowing hot air installed in the preheating zone, the oxygen concentration is no longer affected, and they completed a reflow furnace according to the present invention.

The present invention provides a reflow furnace having a heater for blowing hot air installed in a preheating zone and a main heating zone, wherein a perforated plate having a large number of discharge holes formed therein is installed in a hot air discharge portion of each heater for blowing hot air, and the total area of the discharge holes per unit area of the perforated plate of the heater for blowing hot air installed in the main heating zone is 1.5-5 times the total area of the discharge holes per unit area of the perforated plate of the heater for blowing hot air installed in the preheating zone.

In one embodiment, the number of discharge holes formed per unit area in the perforated plate of the heater for blowing hot air installed in the main heating zone is the same as the number of discharge holes per unit area in the perforated plate of the heater for blowing hot air installed in the preheating zone, but the diameter of the discharge holes in the perforated plate of the heater for blowing hot air installed in the main heating zone is larger than the diameter of the discharge holes in the perforated plate of the heater for blowing hot air installed in the preheating zone.

In another embodiment, the diameter of the discharge holes in the perforated plate of the heater for blowing hot air installed in the main heating zone is the same as the diameter of the discharge holes in the perforated plate of the heater for blowing hot air installed in the preheating zone, but the number of discharge holes per unit area in the perforated plate of the heater for blowing hot air installed in the main heating zone is larger than the number of discharge holes per unit area in the perforated plate of the heater for blowing hot air installed in the preheating zone.

In yet another embodiment, the number of discharge holes per unit area in the perforated plate of the heater for blowing hot air installed in the main heating zone is larger than the number of discharge holes per unit area in the perforated plate of the heater for blowing hot air installed in the preheating zone, and the diameter of the discharge holes in the perforated plate of the heater for blowing hot air installed in the main heating zone is larger than the diameter of the discharge holes in the perforated plate of the heater for blowing hot air installed in the preheating zone.

The present invention also provides a heater for blowing hot air in which an electric heater is arranged inside a box-shaped body, the body is divided by two partitions into a suction chamber at the center and discharge chambers on both sides thereof, the two partitions slope inwards to form a narrow region in an upper portion of the suction chamber, openings which connect the suction chamber and the discharge chambers are formed in the lower portions of the two partitions, a blower is installed in the lower portion of the suction chamber, the upper ends of the discharge chambers have a larger area than the upper end of the suction chamber, and a perforated plate having a large number of discharge holes formed therein is installed on the upper end of the discharge chambers.

The surface of the perforated plate of the heater may be coated with a black ceramic.

In the present invention, if the total area of the discharge holes in the perforated plate of a heater for blowing hot air installed in the main heating zone is smaller than 1.5 times the total area of the discharge holes in the perforated plate of a heater for blowing hot air installed in the preheating zone, the heat input to printed circuit boards in the main heating zone becomes small, and rapid heating to a high temperature can no longer be achieved, while if the total area of the discharge holes in a heater for blowing hot air installed in the main heating zone is more than 5 times the total area of the discharge holes in the perforated plate of a heater for blowing hot air installed in the preheating zone, the balance between the amounts of hot air blown from the preheating zone and the main heating zone is upset, the hot air blown inside the furnace becomes turbulent, and the oxygen concentration is no longer stable. Therefore, the total area of the discharge holes per unit area of the perforated plate of a heater for blowing hot air installed in the main heating zone is made 1.5-5 times the total area of the discharge holes per unit area of the perforated plate of a heater for blowing hot air installed in the preheating zone. More preferably, a value of 3.5 times is ideal.

DESCRIPTION OF PREFERRED EMBODIMENTS

Figure 1:
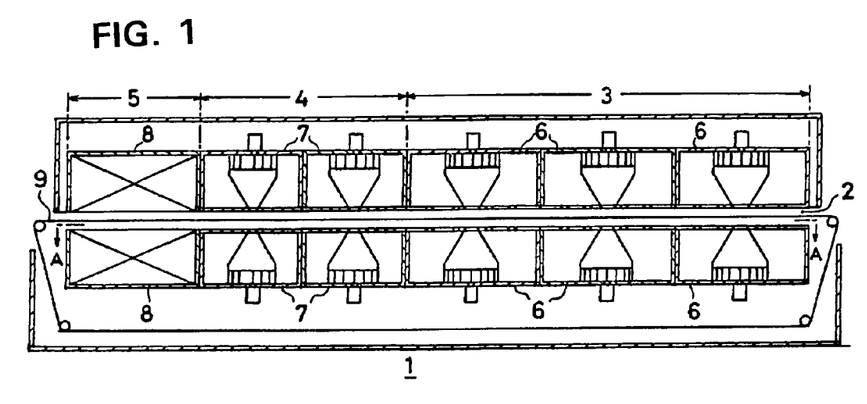
FIG. 1 is a front cross-sectional view of a reflow furnace according to the present invention.
Figure 2:
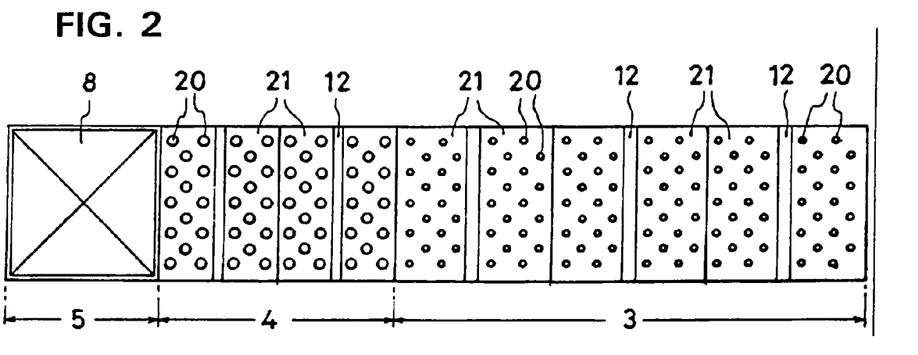
FIG. 2 is cross-sectional view taken along line A-A of FIG. 1.

Below, a reflow furnace according to the present invention will be explained based on the drawings. As shown in the drawings, the reflow furnace 1 has a tunnel 2 formed in the lengthwise direction. The tunnel includes a preheating zone 3, a main heating zone 4, and a cooling zone 5. Three pairs of heaters 6 which blow hot air for preheating are provided in the upper and lower portions of the preheating zone 3. Two pairs of heaters 7 which blow hot air for main heating are provided in the upper and lower portions of the main heating zone 4. One pair of unillustrated coolers 8, 8 is provided in the upper and lower portions of the cooling zone 5. A conveyor 9 which transports printed circuit boards in the direction from the preheating zone 3 to the cooling zone 5 travels inside the tunnel 2.

Figure 3:
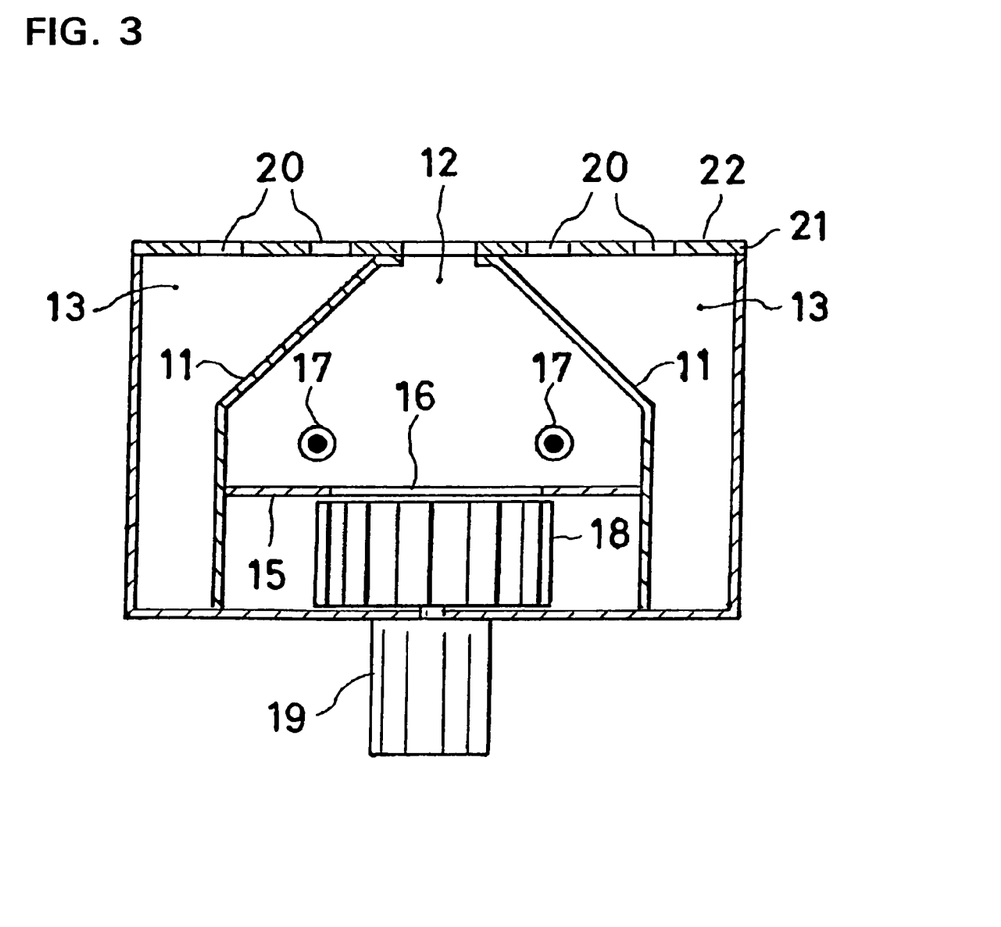
FIG. 3 is a cross-sectional view at the center of a heater for blowing hot air used in the present invention.
Figure 4:
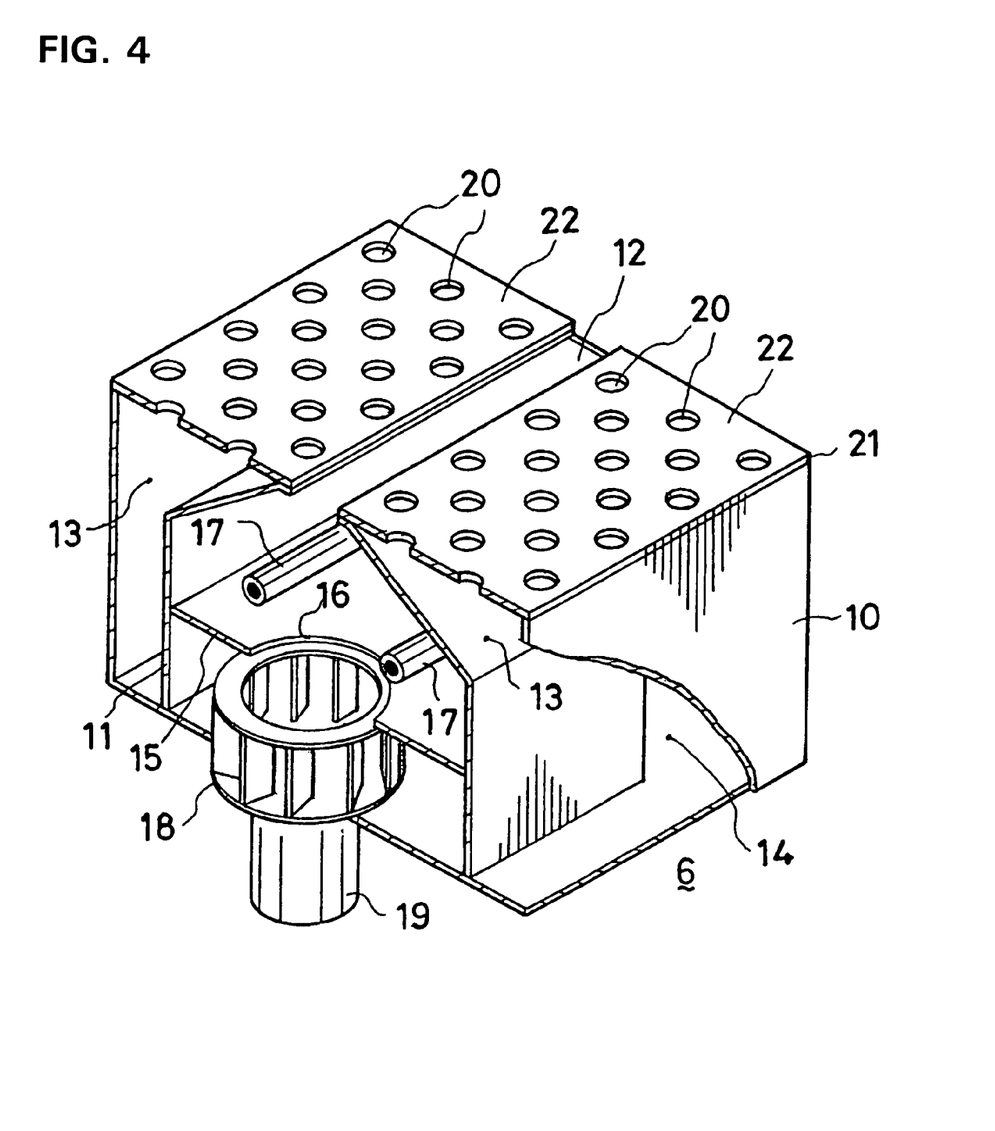
FIG. 4 is a perspective cross-sectional view taken at the center of a heater for blowing hot air used in the present invention.

As shown in FIGS. 3 and 4, the heaters 6 and 7 for blowing hot air have a box-shaped body 10 which is divided by two partitions 11, 11 into a suction chamber 12 and discharge chambers 13, 13. The upper portions of the partitions are sloped towards the center so that the suction chamber 12 narrows at its upper end. The opposite end portions of the partitions 11, 11 have an opening (shown in only one side). These openings serve as discharge ports 14. A horizontal plate 15 is installed in the suction chamber 12. An inlet 16 is formed at approximately its center. Electric heaters 17, 17 are arranged in the upper portion of the suction chamber 12. A sirocco fan 18 is provided below the inlet 16. The sirocco fan 18 is connected to a motor 19 which is installed on the exterior of the body 10.

Perforated plates 21 having a large number of discharge holes 20 formed therein are installed in the upper portions of both discharge chambers 13, 13. The outer surface of the perforated plates is coated with a black ceramic 22 which radiates far infrared rays when it is heated.

The operation of a heater for blowing hot air having the above-described structure will be explained. First, when the electric heaters 17, 17 are conducting, the vicinity of the electric heaters is heated. When the motor 19 is operated and the sirocco fan 18 is rotated, gas is sucked in from the suction chamber 12. Gas which is sucked in through the upper portion of the suction chamber 12 is heated by the electric heaters 17, 17 and becomes hot blown air, and the hot blown air is sucked by the sirocco fan 18 and flows downwards into the lower portion of the suction chamber 12. The hot blown air which flows into the lower portion of the suction chamber 12 flows from the outlets 14 of the partitions 11, 11 into the discharge chambers 13, 13. The hot blown air which flows into the discharge chambers 13, 13, is discharged from the discharge holes 20 in the perforated plates 21, and it heats a printed circuit board passing near the perforated plates 21. At this time, the hot blown air also heats the ceramic 22 which coats the perforated plates 21, so far infrared rays are radiated from the heated ceramic, and these heat the printed circuit board together with the hot blown air.

In the present invention, the total area of the discharge holes per unit area in the perforated plates of the discharge chambers of a heater for blowing hot air installed in the main heating zone is 1.5-5 times the total area of the discharge holes per unit area in the perforated plates of the discharge chambers of a heater for blowing hot air installed in the preheating zone. In the embodiment shown in FIG. 5, A is a perforated plate of one of the discharge chambers of a heater for blowing hot air installed in the main heating zone, and B is a perforated plate of one of the discharge chambers of a heater for blowing hot air installed in the preheating zone. The size of the discharge holes is the same for A and B, but the number per unit area (the region surrounded by a dashed line, which is the same area for A and B) is larger for A. The number of discharge holes 20a per unit area for A is 45, and the number of discharge holes 20b per unit area of B is 23, so A has approximately 2 times the area of B.

Figure 6:
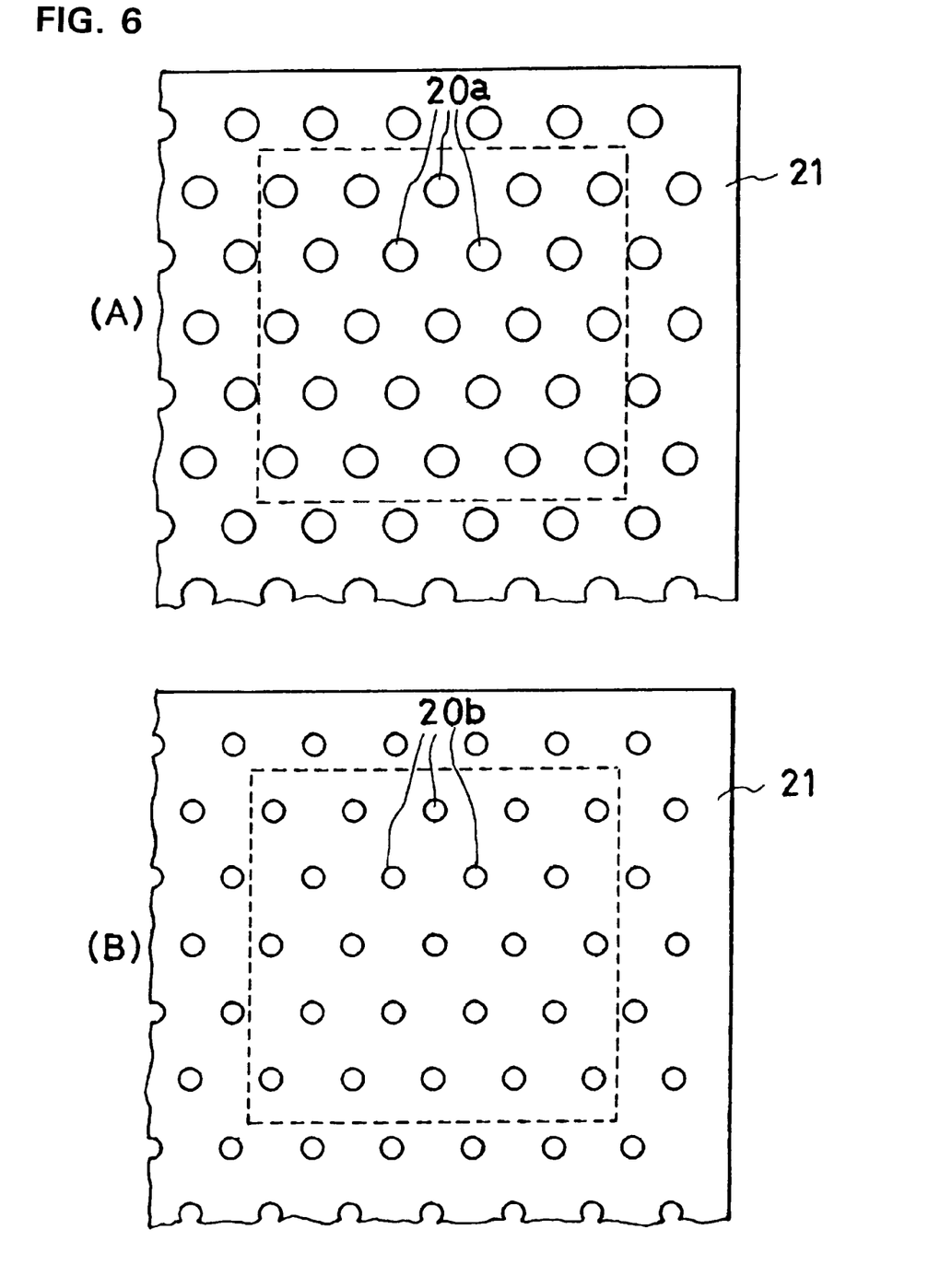
FIG. 6 shows enlarged plan views of other discharge ports provided in the main heating zone and the preheating zone.

In the embodiment shown in FIG. 6, A is a perforated plate of a heater for blowing hot air installed in the main heating zone and B is a perforated plate of a heater for blowing hot air installed in the preheating zone. The number of perforated holes per unit area is the same for A and B, but the size of each discharge hole is larger for A. The diameter of the discharge holes 20a formed in A is 4 mm, while the diameter of the discharge holes 20b formed in B is 2.5 mm, so the area for A is roughly 2.5 times that for B.

Figure 7:
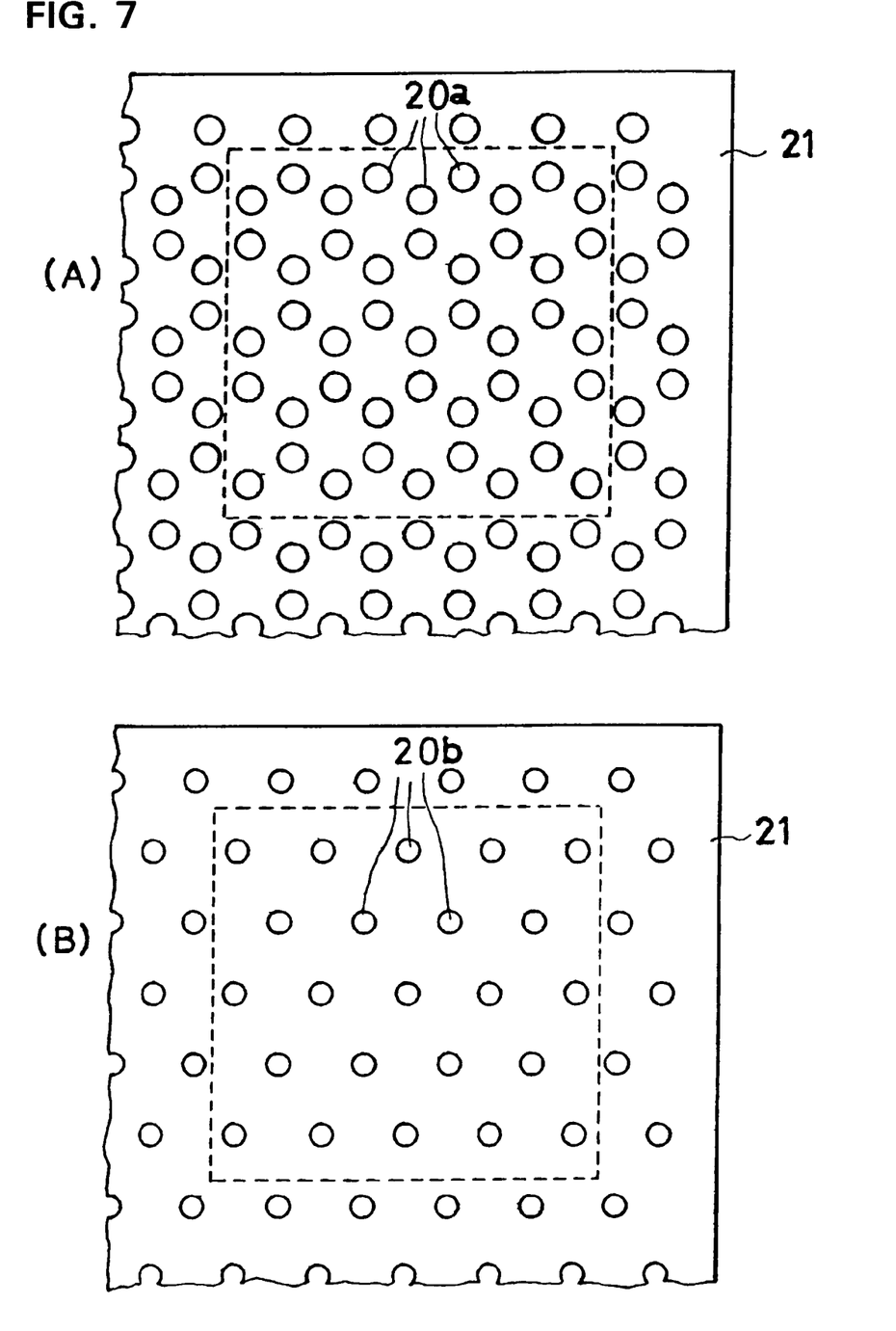
FIG. 7 shows enlarged plan views of still other discharge ports installed in the main heating zone and the preheating zone.

In the embodiment shown in FIG. 7, A is a perforated plate of a heater for blowing hot air installed in the main heating zone, and B is a perforated plate of a heater for blowing hot air installed in the preheating zone. The size of the discharge holes in A and B is larger for A, and the number of holes per unit area is larger for A. The number of discharge holes 20a formed per unit area in A is 45, and the number of discharge holes 20B formed per unit area is B is 23. The diameter of the discharge holes 20a formed in A is 4 mm, and the diameter of the discharge holes 20b formed in B is 2.5 mm. A has approximately 5 times the area of B.

Figure 5:
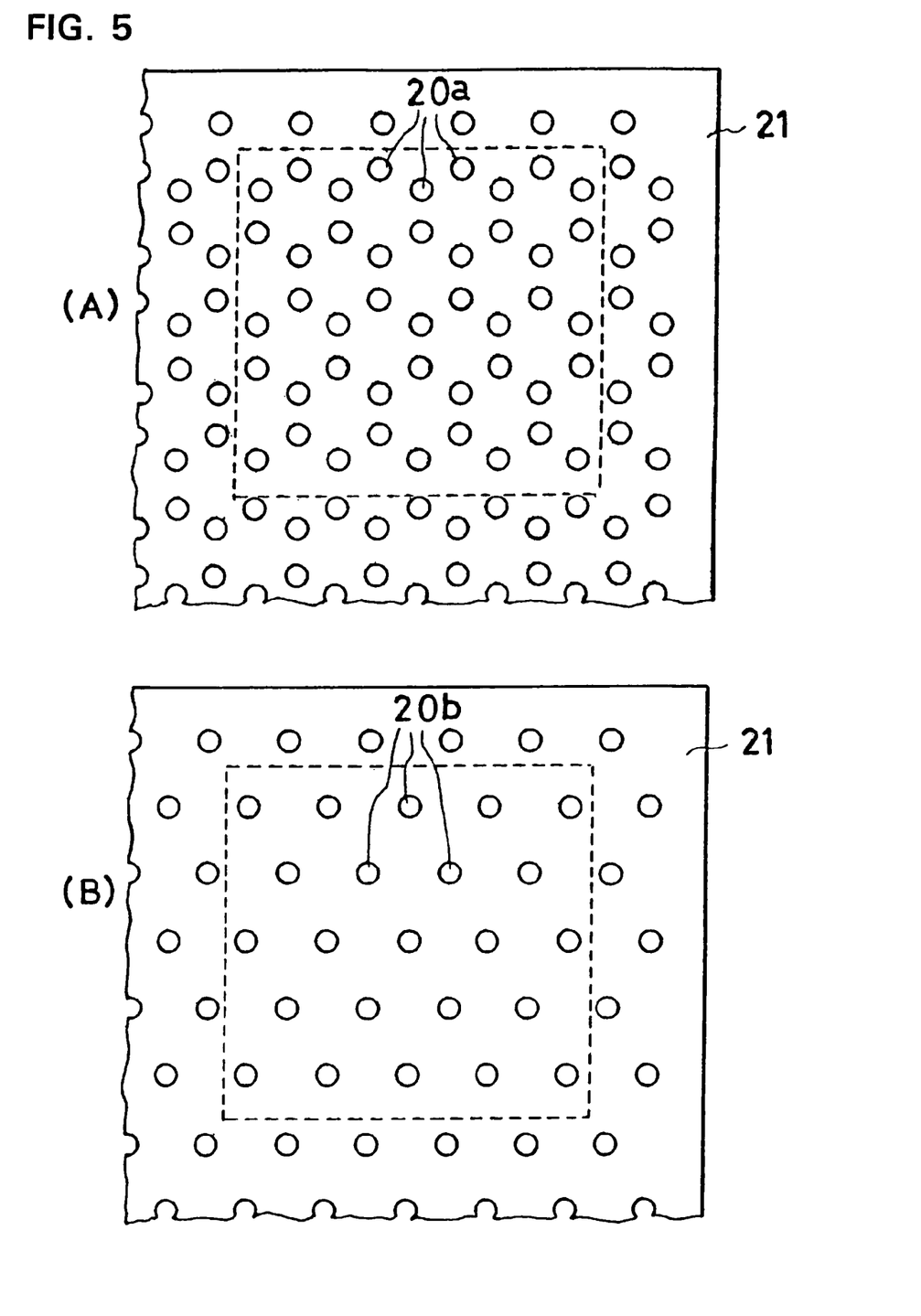
FIG. 5 shows enlarged plan views of discharge ports provided in the main heating zone and the preheating zone.

When soldering of a printed circuit board is carried out in a reflow furnace in which heaters for blowing hot air equipped with the perforated plates of above-described FIGS. 5-7 are installed, the oxygen concentration in the furnace is stable, and Δt is at most 10° C. In contrast, in a conventional reflow furnace, i.e., in a reflow furnace equipped with heaters for blowing hot air in which the total area of discharge holes per unit area in the outlets of heaters for blowing hot air installed in the preheating zone is the same as the total area of discharge holes per unit area in the outlets of heaters for blowing hot air installed in the main heating zone, the oxygen concentration in the furnace was not stable, and Δt was 15° C.

In the embodiments of the present invention, a description was given of a heater for blowing hot air which has a structure in which hot air is discharged from both sides and suction takes place at its center, but in the present invention, as long as the heater for blowing hot air is one which discharges hot air from a large number of discharge holes and heats a printed circuit board, it is possible to use a heater for blowing hot air having any type of structure.

What is claimed is:

1. A heater for blowing hot air in a reflow furnace comprising a box-shaped body having a first end and a second end, a suction chamber disposed inside the body and two discharge chambers disposed inside the body on opposite sides of the suction chamber, an inlet at the first end of the body communicating with the suction chamber and two outlets at the first end of the body each communicating with one of the discharge chambers, a total area of the outlets being larger than an area of the inlet, two partitions disposed on opposite sides of the suction chamber and each separating the suction chamber from one of the discharge chambers and sloping towards each other so that the flow area of the suction chamber decreases towards the inlet, openings which each connect the suction chamber with one of the discharge chambers, a blower installed in the body, and an electric heater disposed in the body downstream of the suction inlet, each discharge chamber having a perforated plate having discharge holes formed therein provided at the first end of the body.

2. A heater as claimed in claim 1 including a separate perforated plate for each discharge chamber.

3. A heater as claimed in claim 2 wherein each perforated plate is coated with a black ceramic.

4. A heater as claimed in claim 1 including a plate which extends between the partitions between the blower and the electric heater and has an inlet for the blower formed therein.

5. A heater as claimed in claim 1 wherein the partitions slope towards each other so as to increase a flow area of each discharge chamber towards the first end of the body.

6. A heater as claimed in claim 1 wherein each partition includes a portion extending parallel to the other partition and a portion sloping towards the other partition.

7. A heater as claimed in claim 1 wherein the suction chamber is prismatic.

8. A heater as claimed in claim 1 wherein the suction chamber has its smallest flow area at the inlet.

9. A heater as claimed in claim 1 wherein the electric heater is disposed in the body on a flow path between the inlet and the blower.

10. A heater as claimed in claim 1 wherein the blower and the electric heater are disposed between the partitions.

11. A heater as claimed in claim 1 wherein the inlet separates the two discharge chambers from each other at the first end of the body.

* * * * *